United States Patent [19]

Yamana et al.

[11] Patent Number: 4,916,010
[45] Date of Patent: Apr. 10, 1990

[54] STAMPING-MOLDABLE MATERIAL

[75] Inventors: Yoshihiro Yamana; Yasuhira Takeuchi, both of Kurashiki, Japan

[73] Assignee: Kuraray Co., Ltd., Kurashiki, Japan

[21] Appl. No.: 210,415

[22] Filed: Jun. 21, 1988

[30] Foreign Application Priority Data

Jun. 25, 1987 [JP] Japan ................. 62-159171

[51] Int. Cl.⁴ .............................................. B32B 5/16
[52] U.S. Cl. ................................... 428/283; 428/280; 428/281; 428/284; 428/285; 428/297; 428/323; 428/324; 428/325; 428/357; 428/363; 428/402
[58] Field of Search ............. 428/283, 285, 297, 323, 428/324, 325, 402, 403, 406, 407, 363, 284, 357, 280, 281

[56] References Cited

U.S. PATENT DOCUMENTS

| | | | |
|---|---|---|---|
| 4,146,528 | 3/1979 | Theysohn | 428/285 |
| 4,247,364 | 4/1981 | Culp | 428/324 |
| 4,291,084 | 9/1981 | Segal | 428/324 |
| 4,552,806 | 11/1985 | Hayashi et al. | 428/324 |
| 4,623,586 | 11/1986 | Umeya et al. | 428/324 |
| 4,806,416 | 2/1989 | Puzo | 428/285 |

Primary Examiner—James J. Bell
Attorney, Agent, or Firm—Oblon, Spivak, McClelland, Maier & Neustadt

[57] ABSTRACT

A stampable molding material composed of a thermoplastic resin containing a reinforcing material of a mat of chopped glass strands and a flake-type filler, having a weight average flake diameter of not more than 100μ, can give molded articles characterized by having a high surface smoothness, high heat resistance, low warping property, and excellent mechanical properties. Such molded articles can advantageously be used as automobile parts, electrical parts, parts of general goods and the like.

10 Claims, 1 Drawing Sheet

STAMPING-MOLDABLE MATERIAL

BACKGROUND OF THE INVENTION

1. Field of the Invention

This invention relates to a stamping-moldable material (hereinafter simply referred to as "stampable material") composed of a thermoplastic resin and capable of producing by stamping molded articles which are required to exhibit a high surface smoothness and heat resistance, no anisotropy in shrinkage on molding, low warping characteristics, excellent mechanical strength and the like for uses such as the exterior parts of automobiles.

2. Discussion of the Background

A method which comprises preheating a thermoplastic resin molding material reinforced with long glass fibers above the melting temperature of the resin and then feeding the preheated material between a pair of molds, followed by rapid pressing to conduct compression molding is called stamping molding or simply stamping. Since this method has such advantages as: being similar to that used to stamp sheet metal; yielding articles having excellent properties such as a lighter weight than sheet metal and resistance to corrosion; high productivity; a solid (monobloc) molding incorporating ribs, bosses, or the like, enabling a reduction in the number of parts; and the like, there is a considerable amount of latent demand for the stamped articles produced by this method for uses including automobile parts, electrical parts, parts for general goods, etc.

There is a known method for preparing molded articles of glass fiber reinforced thermoplastic resin which comprises utilizing a needled glass fiber mat (U.S. Pat. No. 3,664,909). However, this method has several drawbacks. The obtained articles are sometimes insufficiently rigid, thus requiring a high pressure, for example 100 kg/cm$^2$, for obtaining complex-shaped or deep drawn articles, therefore requiring in turn a high-pressure pressing machine. Further, the obtained molded articles exhibit glass fibers blooming on the surface, thereby causing problems in handling and in surface smoothness and rendering difficult the use of the molded articles in exterior parts directly visible or touched by hand. As to the problems of glass fibers blooming or cracks on the surface, it is known that surface smoothness is improved to some degree by incorporating mica into the stampable material (Japanese Patent Application Kókai No. 120727/1985). However it has been noted that the incorporation of a filler worsens the state of impregnation of a stampable material. Therefore, it has been difficult to, without impairing the mechanical properties of a stamped article, incorporate a filler into a glass fiber mat and resin in an amount sufficient to exhibit an improvement on the surface smoothness and have the resulting composition well impregnated and consolidated.

Thus, there is a need for molded articles of reinforced thermoplastic resins which possess good mechanical properties and a smooth surface. There is a further need for a stampable material comprising a reinforced thermoplastic resin which can give molded articles which exhibit good mechanical properties and a smooth surface. There is yet a further need for a process to produce a stampable material comprising a reinforced thermoplastic resin which can give molded articles possessing high surface smoothness and good mechanical properties.

SUMMARY OF THE INVENTION

Accordingly, one object of the present invention is to provide novel molded articles, comprising a reinforced thermoplastic resin, which possess good mechanical properties and a smooth surface.

It is another object of the present invention to provide a novel stampable material, comprising a reinforced thermoplastic resin, which can give molded articles which possess good mechanical properties and a smooth surface.

It is a further object of the present invention to provide a novel process for the production of a stampable material, comprising a reinforced thermoplastic resin, which can give molded articles having a high surface smoothness and good mechanical properties.

The above objects can be achieved by a stampable material composed of a thermoplastic resin incorporating from 20 to 60% by weight of reinforcing materials. The reinforcing materials of the present invention comprise a fibrous reinforcing material of a mat of chopped glass strands having fiber lengths of not less than 20 mm, each one of the strands being bonded with a binder to others (hereinafter simply referred to as "chopped glass strand mat") and from 10 to 50% by weight of a flake-type filler having a weight average flake diameter of not more than 100μ.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
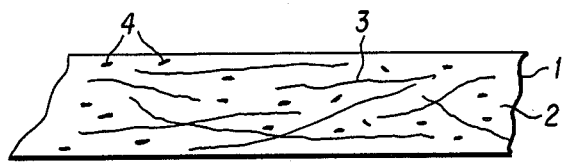
FIG. 1 is a diagrammatic sectional view of a stampable material according to the present invention.

One aspect of the present invention is a stampable material, comprising a reinforced thermoplastic resin, which can give molded articles possessing good mechanical properties and a high surface smoothness. The present invention may be applied to any suitable thermoplastic resin.

Examples of suitable thermoplastic resins include, but are not limited to: polyester resins such as polyethylene terephthalate and polybutylene terephthalate; polyamide resins such as nylon 6, nylon 66, and nylon 12; polyolefin resins such as polypopylene, polymethylpentene, and polyethylene; aromatic polysulfone resins such as polysulfone, polyallylsulfone, and polyethersulfone; polyacetal resins; polycarbonate resins; modified polyphenylene oxide resins; polyetherimide resins; polyether-ketone resins; ABS resins; and the like. Preferred thermoplastic resins include polyethylene terephthalate, polybutylene terephthalate, polypropylene, polycarbonate, and polyphenylene sulfide. Particularly preferred thermoplastic resins are polyesters such as polyethylene terephthalate and polybutylene terephthalate.

These resins may be used by themselves as such, in modified states, or in blends, and may also incorporate additives such as antioxidants, ultraviolet light absorbers, cupper-hazard preventors, fire retardants, colorants, release agents, plasticizers, antistatic agents, and the like. The form of the thermoplastic resins to be used is not limited, but it is preferably a sheet form insofar as this form facilitates impregnation with a reinforcing material.

The fibrous reinforcing material having a mat form which constitutes one component of the total reinforcing material in the present invention is a glass fiber mat composed of chopped glass strands having fiber lengths of not less than 20 mm uniformly distributed in random directions, each of the chopped glass strands being bonded to others with a binder, and formed into a mat, for which any conventional known chopped glass strand mat can be used. It is preferred that the chopped glass strand mat used in this invention is one having a weight of from 100 to 1800 g/m² and be formed by bonding each chopped glass strand made up of from 10 to 200 filaments of diameters ranging from 5 to 30µ with a binder to other surrounding strands. It is particularly preferred to use a chopped glass strand mat having a weight of from 200 to 1200 g/m² formed by bonding each glass chopped strand made up of from 20 to 100 filaments of diameters ranging from 8 to 25µ with a binder to other surrounding strands. The glass fibers are preferably treated with a treating agent capable of giving a suitable adhesiveness to the surface thereof, such as a silane coupling agent or the like.

According to the present invention, it is essential that as a reinforcing material, in addition to the above-mentioned chopped glass strand mat, a flake-type filler be used. As the flake-type filler, one having a weight average flake diameter of not more than 100µ, preferably not more than 50µ is used. If a filler having an average flake diameter exceeding 100µ is used, it is difficult to obtain an uniform distribution of the filler in the stampable material. While there is no particular lower limit of the flake diameter, flakes having an average flake diameter of not less than 10µ are preferred, and flakes having an average flake diameter of not less than 20µ are particularly preferred.

The flake diameter of flake-type fillers used in this invention is a weight average flake diameter and is determined in the following manner:

(i) classify the flake-type filler with various mesh sieves or microsieves;
(ii) plot the weights obtained on a Rosin-Rammlar diagram;
(iii) determine $l_{50}$ corresponding to an opening of the sieve or microsieve which passed 50% by weight of the flake-type filler submitted for measurement; and
(iv) calculate the average value from equation (1) or (2).

That is, a weight average flake diameter l of a flake-shape filler is calculated from:

$$l = \sqrt{2} \times l_{50} \text{ (where measured with sieves)} \quad (1)$$

$$l = l_{50} \text{ (where measured with microsieves)} \quad (2)$$

Here classification for portions of the flake-type filler having a larger grain size is made with sieves and that for portions having a smaller grain size is made with microsieves.

Flake-type fillers which can be used in the present invention include mica, glass flake, talc, sericite, and the like, among which mica is preferred in the case where a high flexural modulus is required.

It is necessary that the flake-type filler be of from 10 to 50% by weight based on the total weight of chopped glass strand mat and the flake-type filler. In the case where the flake-type filler is contained in an amount less than 10% by weight, the improvement on surface smoothness is insufficient. On the other hand, in the case where the amount of flake-type filler exceeds 50% by weight, impregnation of a thermoplastic resin into the reinforcing material worsens, which causes the obtained molded articles to have unsatisfactory mechanical properties. Where the flake-type filler is contained in the reinforcing material in an amount of from 10 to 50% by weight, if the weight average flake diameter exceeds 100µ, it is difficult for the thermoplastic resin to impregnate uniformly throughout the thickness direction of the stampable material, and stamped articles obtained therefrom will be inferior in mechanical strength.

According to the present invention, it is necessary that the reinforcing material is incorporated in a thermoplastic resin in an amount of from 20 to 60% by weight. In the case where it is incorporated in an amount of less than 20% by weight, it will be difficult to obtain a stampable material capable of producing a molded article exhibiting satisfactory mechanical properties. In the case where the incorporation exceeds 60% by weight, it will be difficult, since the volume of the reinforcing material is too high with respect to that of the thermoplastic resin, to have the reinforcing material fully impregnated with the thermoplastic resin and to obtain a molded article having a superior surface smoothness.

The stampable materials of the present invention can be manufactured by one of the methods described below and can also be manufactured by any method insofar as it enables the glass fiber and flake-type filler to disperse uniformly throughout the thickness direction of the stampable material and be fully impregnated with a thermoplastic resin.

For example, the stampable materials of the present invention are obtained by a method which comprises preparing a thermoplastic sheet with an extruder and a sheeting apparatus, incorporating a flake-type filler into a chopped glass strand mat by a vibration method or the like, laminating the mat(s) with the sheet(s) one above the other, and consolidating the laminate by heat and pressure, followed by cooling. In applying this method, if for example a flake-type filler having a weight average flake diameter exceeding 100µ is used, it will be difficult to incorporate the filler fully inside the chopped glass strand mat, and a considerable amount of the filler will remain in the surface layer of the chopped glass strand mat. Then, when performing impregnation and consolidation, the flake-type filler remaining in the surface layer of the chopped glass strand mat acts to prevent the thermoplastic resin from impregnating into the chopped glass strand mat. As a result, a stampable material in which the reinforcing materials are well impregnated and integrated with the thermoplastic resin is not obtained. In this case, the molded articles obtained from such materials possess unsatisfactory mechanical properties.

On the other hand, in the case where a flake-type filler having a weight average flake diameter as specified in this invention, that is of less than 100μ and preferably less than 50μ, is incorporated, the aforedescribed phenomenum does not occur, and it is possible to incorporate the filler through the interstices of the glass fibers uniformly into the internal areas of the chopped glass strand mat layer. Thus, in the obtained stampable material the chopped glass strand mat and the flake-type filler are fully impregnated and well integrated throughout the entire thickness direction to give the molded articles an improved surface smoothness while maintaining satisfactory mechanical properties.

Another method for the manufacture of the stampable material of this invention comprises preparing beforehand a sheet of a thermoplastic resin incorporated with a flake-type filler in an extruder and a sheeting apparatus, feeding the sheet(s) and a chopped glass strand mat(s) disposed one above the other into an apparatus equipped with a pair of moving beltings (upper belt and lower belt), impregnating and consolidating the composite by the application of heat and pressure, followed by cooling.

In this second method, similar to the case of the first method, if the flake-type filler possesses a weight average flake diameter exceeding 100μ, the majority of the flake-type filler will tend to be filtered by chopped glass strand mat causing only the thermoplastic resin to impregnate inside the chopped glass strand mat, and thereby it will be difficult to uniformly disperse the flake-type filler throughout the entire area in the thickness direction. By employing a relatively small grain-size filler having a weight average flake diameter as specified in this invention, that is, of not more than 100 μ, it becomes possible for the resin and the flake-type filler to fully penetrate uniformly into the chopped glass strand mat. Molded articles obtained therefrom have satisfactory mechanical properties and exhibit improved surface smoothness.

Referring now to the drawings, wherein like reference numerals designate identical or corresponding parts throughout the several views, and more particularly to FIG. 1 thereof, which is a diagrammatic sectional view of a stampable material, 1, according to the present invention, it is seen that the thermoplastic resin 2, the chopped glass strand mat, 3, and the flake-type filler, 4, are all distributed uniformly throughout the thickness direction of the stampable material.

Figure 2:
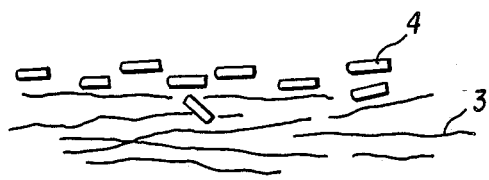
FIG. 2 is a diagrammatic view illustrating a material containing a filler having a bigger flake diameter than that of the present invention.

FIG. 2 illustrates the result of using a filler having a bigger flake diameter than that of the present invention. In this case, the flake-type filler, 4, is too large to be fully incorporated inside the chopped glass strand mat, 3, and a considerable amount of the filler remains at the surface layer of the chopped glass strand mat.

Figure 3:
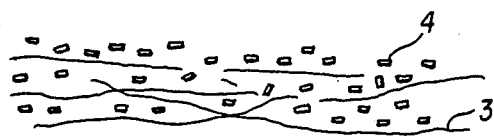
FIG. 3 is a diagrammatic view illustrating the uniform incorporation of a flake-type filler according to the present invention into the interstices of the glass fibers.

FIG. 3 illustrates the results of using a flake-type filler, 4, having a diameter according to that of the present invention and shows that the filler is fully incorporated into the interstices of the glass fiber mat, 3.

In the stampable material of the present invention a flake-type filler is dispersed uniformly, and molded articles obtained therefrom have superior mechanical strength and surface smoothness. Therefore the molded articles are advantageously used for a wide range of end-uses such as automobile parts, electric parts, parts for general goods, and the like.

For example, they may be used for the board of a hand truck; car parts such as sunroof, door trim, louver, bumper, oil tank, engine undercover, engine head cover, dash and package tray; parabollic antenae; speaker boxes; musical instrument cases; suitcase frames; various structural elements; and the like.

The molded articles of the present invention may be prepared by using any suitable molding technique. A preferred molding technique is stamping. Stamping with preheated molds is particularly preferred.

Other features of the invention will become apparent in the course of the following descriptions of exemplary embodiments which are given for illustration of the invention and are not intended to be limiting thereof. Various characteristics in the examples were evaluated according to the following methods.

1. Flexural strength and flexural modulus: ASTM D790
2. Notched Izod impact strength: ASTM D250
3. Surface smoothness: The surface of a molded article was measured with a Surface Roughness Scale (Model SE-4 available from Kosaka Research Laboratory) for surface roughness and evaluated by Rmax (maximum height)
4. State of impregnation of blank: the cross section of a blank was visually evaluated as:

| State of cross section | Evaluation |
| --- | --- |
| Uniform | O (good) |
| Marginal impregnation into chopped glass strand mat | Δ (marginal) |
| Almost no impregnation inside chopped glass strand mat | X (bad) |

EXAMPLES 1 TO 3 AND COMPARATIVE EXAMPLE 1

Polyethylene terephthalate (PET) with $[\eta]=0.70$ was kneaded with mica (Suzorite Mica 325S available from Kuraray Co., having a weight average flake diameter of 40μ) in the ratios shown in Table 1 in an extruder, the cylinder of which was kept at a temperature of 270° C., and thereafter extruded from the die into molten sheets, followed by cooling on a cooling roll to give sheets.

Then the sheets were separately laminated with a chopped glass strand mat, having a weight of 450 g/m$^2$ and composed of fibers having a fiber diameter of 13μ and a fiber length of 50 mm, one above the other to give laminates. The laminates were integrated by simultaneously heating at about 300° C. and pressing to give stampable materials having thicknesses of about 4 mm and the compositions shown in Table 1. All of the stampable materials obtained here showed good states of impregnation.

The stampable materials obtained were each cut into a material sheet of 80 mm×160 mm. Each material sheet was heated to 300° C. to melt the resin, then quickly transferred to a preheated mold at 160° C. having inside dimensions of 100 mm×200 mm and there subjected to stamping molding to give a flat article about 2 mm thick. The articles thus obtained had, as shown in Table 1, improved surface smoothnesses, while maintaining satisfactory mechanical strengths.

EXAMPLE 4

Following the same procedure as in Example 1 except that the type of mica was changed to Suzorite Mica 200S (made by Kuraray Co., having a weight average flake diameter of 80μ), a stampable material of the composition shown in Table 1 was prepared. The stampable material appeared, when its cross section was observed, to not be fully impregnated. The article obtained by further molding the stampable material in the same manner as in Example 1 proved to be excellent both in mechanical properties and surface smoothness.

COMPARATIVE EXAMPLE 2

A stampable material was prepared in a manner similar to that in Example 1 while using Suzorite Mica 325S (made by Kuraray Co., having a weight average flake diameter of 40μ) as filler and increasing the content of the reinforcing materials as shown in Table 1. Observation of the cross section of the obtained stampable material indicated that the resin and the filler did not practically penetrate into the chopped glass strand mat layer and were not uniformly dispersed throughout the thickness direction.

The stampable material was further subjected to stamping molding in the same manner as in Example 1. The obtained article was, as shown in Table 1, considerably inferior in mechanical properties.

COMPARATIVE EXAMPLE 3

A stampable material of the composition shown in Table 1 was prepared in the same manner as in Example 1 except for using a mica having a large weight average flake diameter, i.e., Suzorite Mica 60S (made by Kuraray Co., having a weight average flake diameter of 280μ). When the cross section of the obtained stampable material was observed, it was found that only the resin penetrated into the chopped glass strand mat layer, and the mica remained unincorporated thereinto and was not uniformly dispersed throughout the thickness direction.

The stampable material was further subjected to stamping molding in the same manner as in Example 1. The obtained article was, as shown in Table 1, considerably inferior in mechanical properties.

EXAMPLES 5 to 7

For the purpose of studying how the type of thermoplastic resin influences the impregnation capability of the blank and the mechanical properties and surface smoothness of the molded article, tests were made using a variety of thermoplastic resins while keeping the content of reinforcing materials constant.

As thermoplastic resins, polybutylene terephthalate (PBT), polypropylene (PP) and polycarbonate (PC) were used. They were each kneaded with a filler in an extruder, the cylinder of which was kept at 250° C. (PBT), 200° C. (PP) and 260° C. (PC). Each mixture was then extruded through the die into a molten sheet and cooled on a cooling roll to give a sheet.

Heating and pressing the sheets as in Example 1, with heating conditions set at 250° C. (PBT), 220° C. (PP), and 260° C. (PC), gave stampable materials of the compositions shown in Table 1. All of the stampable materials obtained here exhibited a sufficient impregnation.

Flat articles were obtained from the above stampable materials in the same manner as in Example 1, except that the heating temperatures for melting were 250° C. (PBT), 220° C. (PP), and 260° C. (PC) and the die temperatures were 100° C. (PBT), 60° C. (PP), and 150° C. (PC). Each of the thus-obtained flat articles, though varying in properties depending on the type of thermoplastic resin, exhibited excellent mechanical properties, as shown in Table 1. Further, the surface smoothnesses varied very little depending on the type of thermoplastic resin and were nearly as good as those in Example 1.

EXAMPLES 8 TO 9 AND COMPARATIVE EXAMPLE 4

For the purpose of studying how the type of filler used influences the impregnation capability of the blank and the mechanical properties and surface smoothness of the molded article, tests were made using a variety of fillers, while keeping the content of the reinforcing materials constant.

Fillers employed for the test were glass flake which is a flake-type filler (Nippon Sheet Glass Co. CEF 325, having a weight average flake diameter of 40 μ), talc (Micron White 5000S available from Hayashi Chemical Co., having a weight average flake diameter of not more than 3μ) and a granular filler of glass beads (GB731B available from Toshiba-Ballotini Co.).

All of the obtained stampable materials exhibited good impregnation as shown in Table 1. The stampable materials were further molded as in Example 1 into flat articles. The article obtained from the material utilizing the glass flake filler (Example 8) exhibited satisfactory mechanical properties and smoothness, but it was inferior to the article utilizing mica as the filler. The use of talc also produced satisfactory properties (Example 9), but the small weight average flake diameter resulted in an article inferior to that utilizing mica as a filler. On the other hand, the glass bead filler did not, due to its granular shape give an article with satisfactory mechanical properties, although superior surface smoothness was obtained (Comparative Example 4).

COMPARATIVE EXAMPLE 5

Stampable materials with a low mica content were prepared as in Example 1, as shown in Table 1. The stampable materials exhibited good impregnation. However, flat articles obtained from the stampable materials as in Example 1 possessed poor surface smoothnesses, although their mechanical properties were high.

Obviously, numerous modifications and variations of the present invention are possible in light of the above teachings. It is therefore to be understood that within the scope of the appended claims, the invention may be practiced otherwise than as specifically described herein.

TABLE 1

| | Composition | | | | | Impregnation of blank | Evaluation of molded article | | | |
| | Resin | | Glass mat wt % | Flake-type filler | | | Flexural strength $(kg/mm^2)$ | Flexural modulus $(kg/mm^2)$ | Notched Izod impact strength $(kg \cdot cm/cm)$ | Surface roughness $(\mu)$ |
| | Type | Wt % | | Type | Wt % | | | | | |
| Ex. | | | | | | | | | | |
| 1 | PET | 50 | 30 | mica | 40μ | 20 | O | 21 | 1300 | 55 | 5.5 |
| 2 | PET | 60 | 30 | mica | 40μ | 10 | O | 21 | 1050 | 47 | 9.5 |
| 3 | PET | 40 | 40 | mica | 40μ | 20 | O | 24 | 1500 | 77 | 6.0 |
| 4 | PET | 50 | 30 | mica | 80μ | 20 | Δ | 18 | 1100 | 60 | 6.0 |

TABLE 1-continued

| | Composition | | | | | Impregnation of blank | Evaluation of molded article | | | |
|---|---|---|---|---|---|---|---|---|---|---|
| | Resin | | Glass mat | Flake-type filler | | | Flexural strength | Flexural modulus | Notched Izod impact strength | Surface roughness |
| | Type | Wt % | wt % | Type | Wt % | | (kg/mm²) | (kg/mm²) | (kg · cm/cm) | (μ) |
| 5 | PBT | 50 | 30 | mica | 40μ | 20 | O | 20 | 1200 | 60 | 5.5 |
| 6 | PP | 50 | 30 | mica | 40μ | 20 | O | 11 | 750 | 50 | 6.0 |
| 7 | PC | 50 | 30 | mica | 40μ | 20 | O | 18 | 1000 | 65 | 6.0 |
| 8 | PET | 50 | 30 | glass flake | 40μ | 20 | O | 20 | 1250 | 50 | 6.0 |
| 9 | PET | 50 | 30 | talc | ≦3μ | 20 | O | 18 | 1100 | 50 | 6.0 |
| Comp. Ex. | | | | | | | | | | | |
| 1 | PET | 60 | 40 | — | — | — | O | 24 | 1050 | 70 | 18.0 |
| 2 | PET | 30 | 40 | mica | 40μ | 30 | X | 12 | 600 | 65 | 5.0 |
| 3 | PET | 50 | 30 | mica | 280μ | 20 | X | 14 | 600 | 65 | 6.0 |
| 4 | PET | 50 | 30 | (glass beads)* | | 20 | O | 15 | 900 | 50 | 6.5 |
| 5 | PET | 60 | 37 | mica | 40μ | 3 | O | 24 | 1100 | 68 | 15.5 |

*Granular filler

What is claimed as new and desired to be secured by Letters Patent of the United States is:

1. A stampable material comprising:
 (i) a thermoplastic resin and
 (ii) a reinforcing material in an amount of from 20 to 60% by weight of said stampable material, said reinforcing material comprising (a) a mat of chopped glass strands having fiber lengths of not less than 20 mm, each of said strands being bonded with a binder to others and (b) a flake-type filler, having a weight average flake diameter of not more than 100μ, in an amount of from 10 to 50% by weight of said reinforcing material.

2. The stampable material of claim 1, wherein said weight average flake diameter is in the range of from 10μ to 100μ.

3. The stampable material of claim 1, wherein said weight average flake diameter is in the range of from 10μ to 50μ.

4. The stampable material of claim 1, wherein said thermoplastic resin is at least one member selected from the group consisting of polyethylene terephthalate, polybutylene terephthalate, polycarbonate, and polypropylene.

5. The stampable material of claim 4, wherein said thermoplastic resin is polyethylene terephthalate.

6. The stampable material of claim 1, wherein said flake-type filler is at least one member selected from the group consisting of mica, glass flake, talc, and sericite.

7. The stampable material of claim 6, wherein said flake-type filler is mica.

8. The stampable material of claim 1, wherein said mat of chopped glass strands has a weight of from 100 to 1800 g/m² and is composed of chopped glass strands comprising from 10 to 200 filaments, said filaments having diameters of from 5 to 30 μ, each one of said strands being bonded to others with a binder.

9. The stampable material of claim 1, wherein said mat of chopped glass strands has a weight of from 200 to 1200 g/m² and is composed of chopped glass strands comprising from 20 to 100 filaments, said filaments having diameters of from 8 to 25μ, each one of said strands being bonded to others with a binder.

10. A molded article obtained by stamping the stampable material of claim 1.

* * * * *